United States Patent [19]

Robinson et al.

[11] Patent Number: 5,434,906
[45] Date of Patent: Jul. 18, 1995

[54] METHOD AND APPARATUS FOR PROCESSING AN INCOMING CALL IN A COMMUNICATION SYSTEM

[76] Inventors: Michael J. Robinson, 4512 - 32nd Ave. W.; Robert C. Greco, 4570 W. Cramer, both of, Seattle, Wash. 98199

[21] Appl. No.: 119,380
[22] Filed: Sep. 13, 1993
[51] Int. Cl.⁶ .......................... H04M 1/64; H04M 3/58
[52] U.S. Cl. ........................ 379/67; 379/210; 379/212; 379/214; 379/76
[58] Field of Search .............. 379/67, 76, 88, 89, 379/71, 84, 210, 211, 212, 213, 214, 215

[56] References Cited

U.S. PATENT DOCUMENTS

| | | | |
|---|---|---|---|
| 4,544,804 | 10/1985 | Herr et al. | 379/210 X |
| 4,661,975 | 4/1987 | Brecher | 379/211 X |
| 4,696,028 | 9/1987 | Morganstein et al. | 379/212 |
| 4,697,282 | 9/1987 | Winter et al. | 379/84 X |
| 4,723,211 | 2/1988 | Diesel et al. | 379/211 |
| 4,747,124 | 5/1988 | Ladd | 379/67 |
| 4,783,796 | 11/1988 | Ladd | 379/67 |
| 4,809,321 | 2/1989 | Morganstein et al. | 379/211 |
| 4,811,381 | 3/1989 | Woo et al. | 379/67 |
| 4,866,755 | 9/1989 | Hashimoto | 379/96 X |
| 4,926,462 | 5/1990 | Ladd et al. | 379/89 X |
| 4,935,956 | 6/1990 | Hellwarth et al. | 379/114 X |
| 4,942,598 | 7/1990 | Davis | 379/211 X |
| 4,975,941 | 12/1990 | Morganstein et al. | 379/88 |
| 4,985,913 | 1/1991 | Shalom et al. | 379/76 X |
| 5,007,076 | 4/1991 | Blakley | 379/215 X |
| 5,027,384 | 6/1991 | Morganstein | 379/67 |
| 5,029,196 | 7/1991 | Morganstein | 379/67 |
| 5,029,198 | 7/1991 | Walpole et al. | 379/88 |
| 5,031,205 | 7/1991 | Phillips | 379/88 |
| 5,058,152 | 10/1991 | Solomon et al. | 379/196 X |
| 5,228,073 | 7/1993 | Smith | 379/170 X |
| 5,278,894 | 1/1994 | Shaw | 379/67 |
| 5,309,505 | 5/1994 | Szlam et al. | 379/77 X |
| 5,309,512 | 5/1994 | Blackmon et al. | 379/210 |
| 5,317,630 | 5/1994 | Feinberg et al. | 379/210 X |
| 5,327,486 | 7/1994 | Wolff et al. | 379/214 X |

FOREIGN PATENT DOCUMENTS

| | | | |
|---|---|---|---|
| 2577093 | 8/1986 | France | 379/76 |
| 61-39756 | 2/1986 | Japan | 379/76 |

OTHER PUBLICATIONS

McNinch, "Screen Based Telephony," Apr. 1990 IEEE Communications Magazine, pp. 34-38.
"CWD Feature Requirements", Dec., 1987 TR-TS-4-000416.
"Announcing the Electronic Receptionist," Bellcore, Jan., 1993.
"Call Waiting Deluxe Feature", Apr., 1993 TA-NOO-T-000416.

Primary Examiner—James L. Dwyer
Assistant Examiner—Daniel S. Hunter
Attorney, Agent, or Firm—Graybeal Jackson Haley & Johnson

[57] ABSTRACT

A method and apparatus for providing a telephone user with automated attendant functions with numerous selectable options. The options include selecting one or many greetings to be given to the caller before sending the caller to voice mail, recording a new greeting for the caller after learning the caller's identity, re-routing the call and adding an audio message to be delivered to the substitute called party before the call is connected, and delivering a selected or customized greeting to the caller and then placing the caller on hold without accepting the call. A display screen with a cursor is used to facilitate presentation of information and options to the telephone user and selection of options by the telephone user.

9 Claims, 5 Drawing Sheets

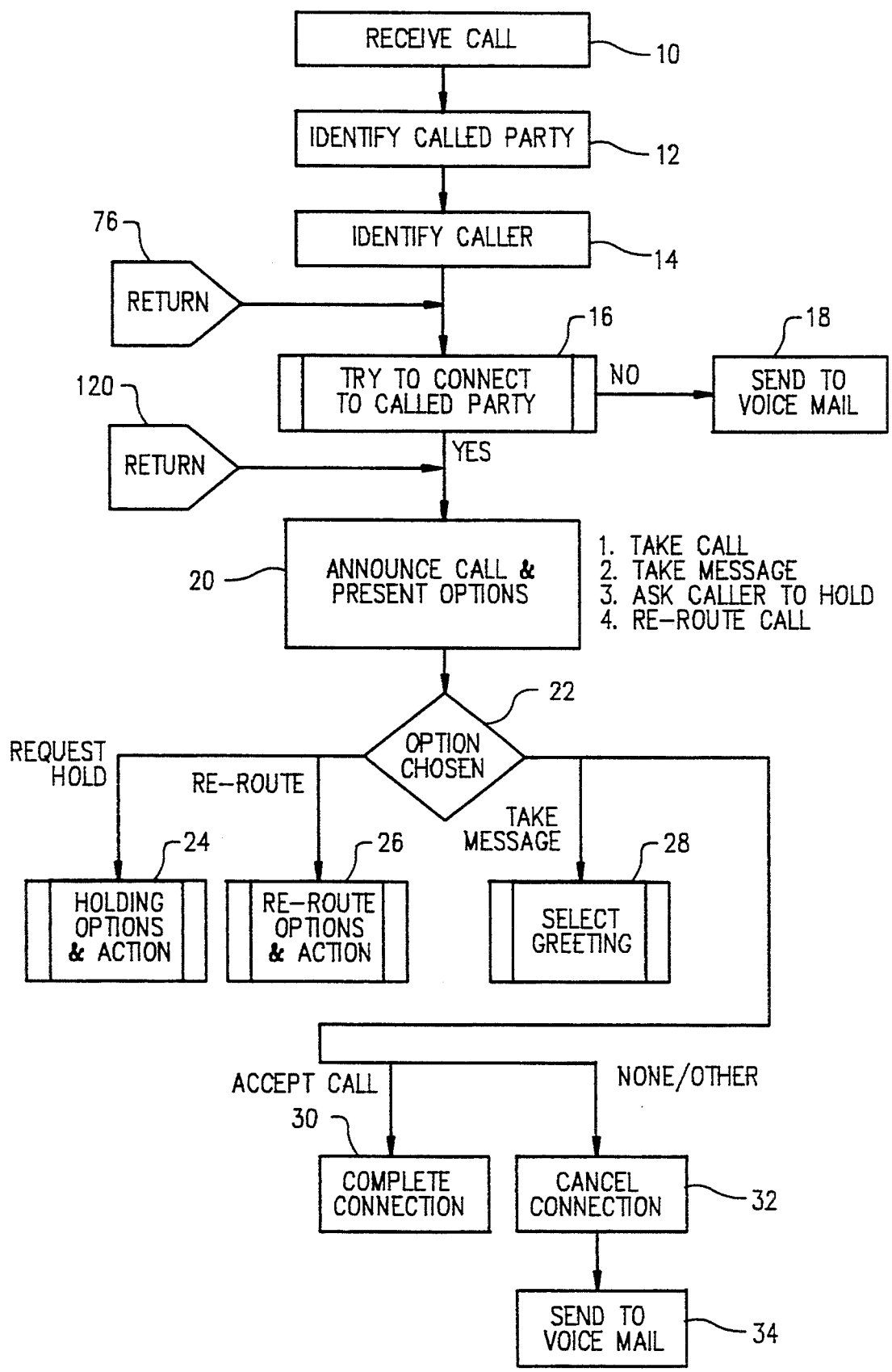

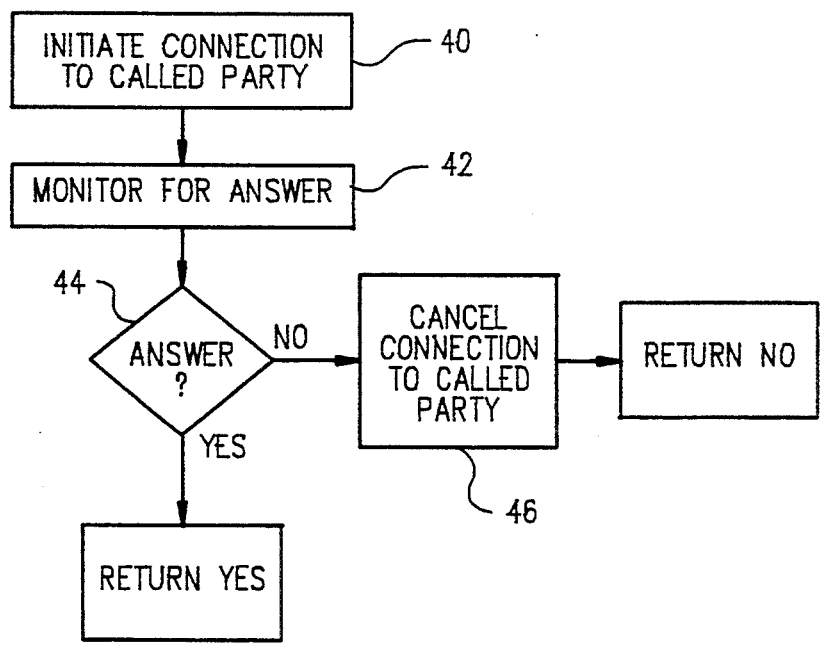
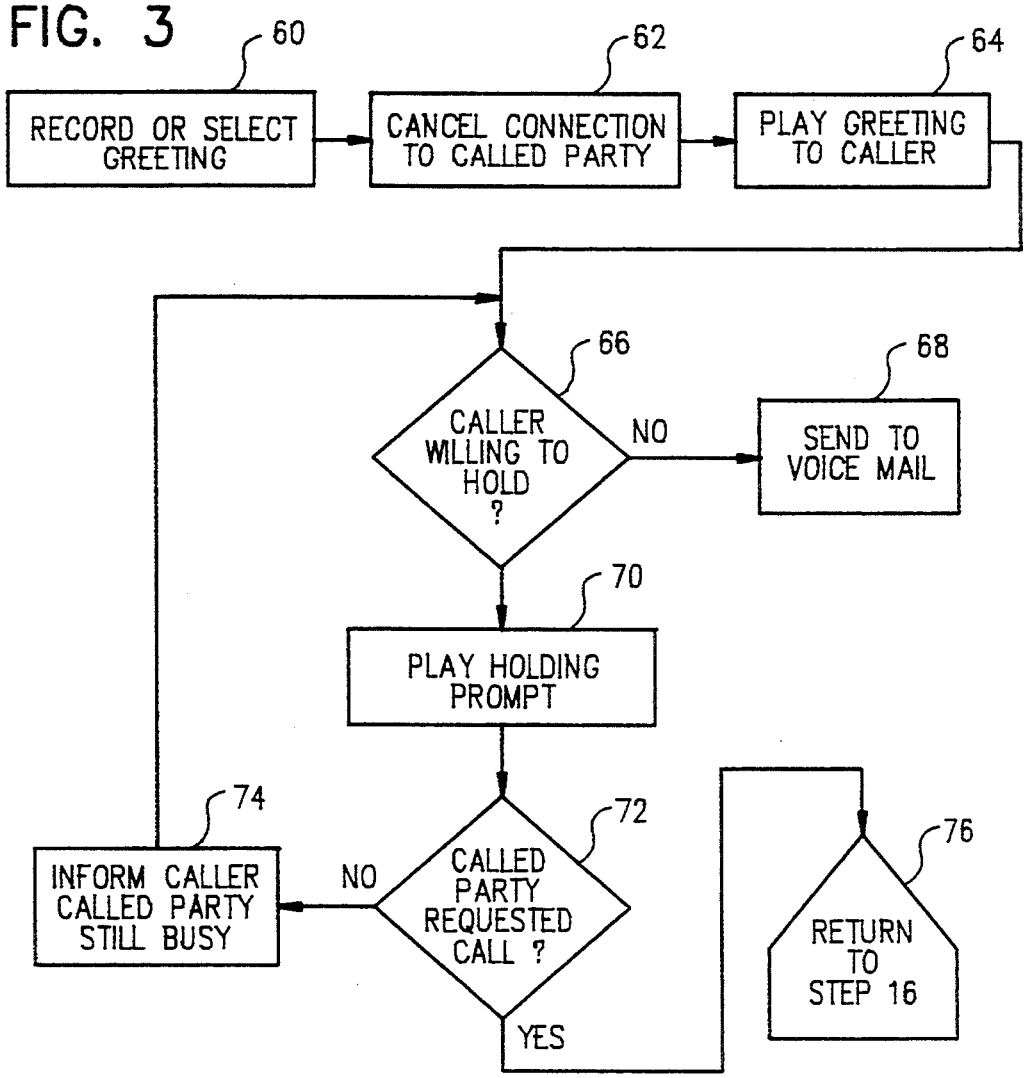

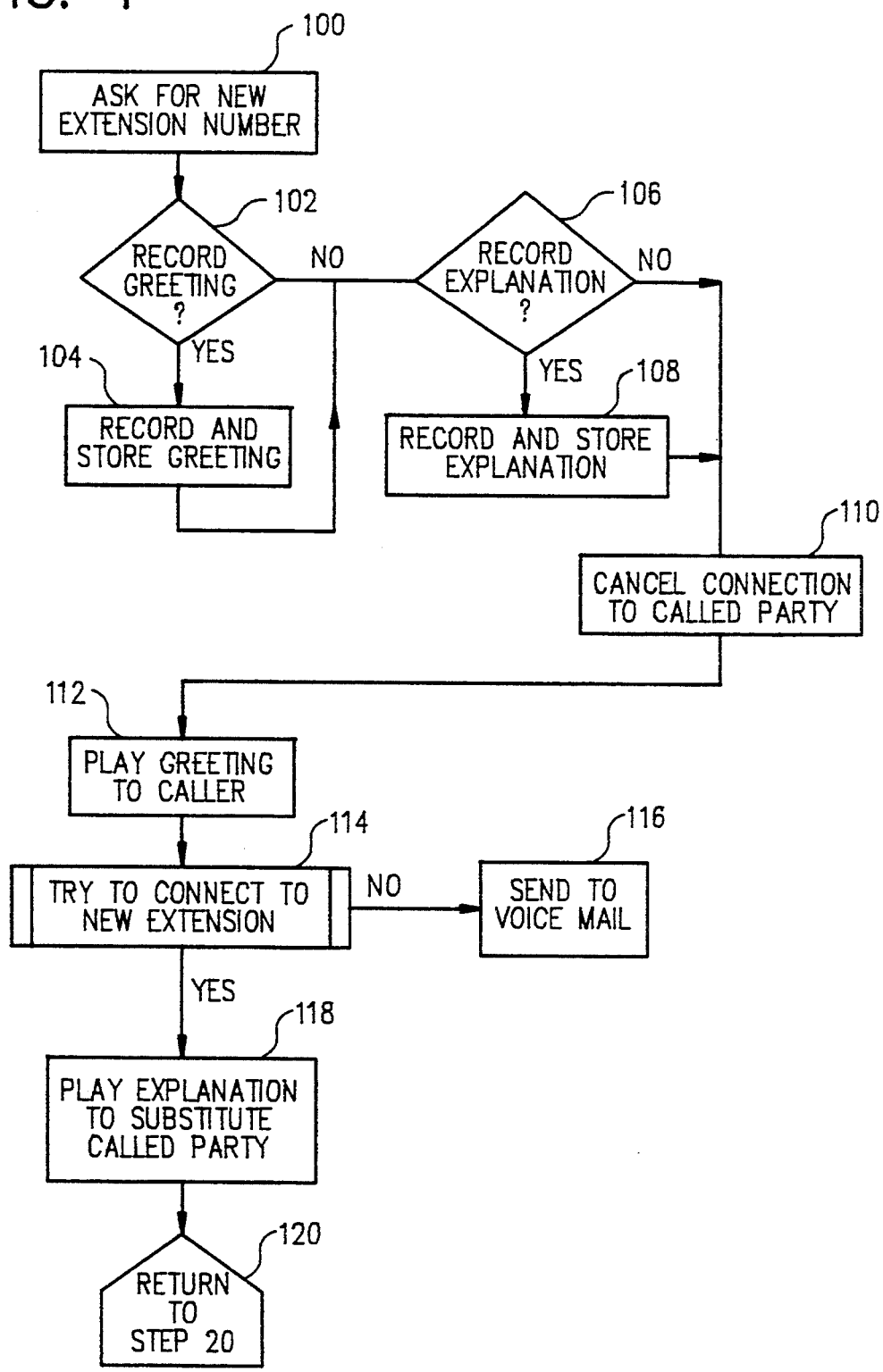

METHOD AND APPARATUS FOR PROCESSING AN INCOMING CALL IN A COMMUNICATION SYSTEM

TECHNICAL FIELD

The present invention relates to a method and apparatus for processing a call from a caller to a called party, and more particularly, to a method and apparatus for sending a notification to the called party of the receipt of the call from a caller and providing the called party with options for handling the call.

BACKGROUND OF THE INVENTION

Telephone auto attendant systems are well known. They implement automatically various actions that might be performed by a switch board operator. Auto attendant systems can be implemented from a telephone system central office or, more commonly, in customer premises telephone systems with a private branch exchange (PBX).

The most common feature is call routing. For example, when a call is received by the PBX, an auto attendant system answers and plays a message such as "Enter 1 for Sales, 2 for Technical Support, or 3 for Administration;" or "please enter the extension number of the person you wish to talk to. If you do not know the extension, press 99 for a directory." When the requested information is entered, possibly after the caller listens to part or all of a directory, the call processor forwards the call to the designated extension. In this case, the auto attendant is routing the call in place of a live operator. Contemporary telephone systems can also accomplish automatic routing with direct inward dial (DID) or dialed number information services (DNIS).

Some auto attendant systems include a call screening feature which, after the extension is designated by the caller, asks the caller "May I say who is calling?," records any response by the caller, and plays the recording to the called party so the called party can decide whether to take the call. The called party then presses a key to take the call or presses another key to instruct the auto attendant system to play a recording like "Mr. Smith is unavailable, please leave a message . . . ," possibly followed by a further prompt to the calling party.

Some auto attendant systems include an auto forward feature. This feature is enabled by the extension owner, before leaving the extension. In the event a call is received, the auto forward feature instructs the auto attendant system to ring another extension that has been specified by the extension owner or to dial back out and connect the caller to the dialed line outside of the called party's telephone system. In some auto attendant systems, the extension owner may record a message to be played to callers before the call is forwarded.

Some auto attendant systems include a call blocking feature which allows the extension owner to instruct the auto attendant system to play a message to the caller, stating that the called party is not available, or to connect the caller to a voice mail system to leave a message.

Some auto attendant systems include a call holding feature which operates if the designated extension is busy. This feature gives the caller the option to be placed on hold and subsequently put through to the called party if the extension becomes available.

An auto attendant feature is included in some call waiting systems. When the extension owner's phone is busy, a call waiting tone interrupts the call, signalling the extension owner that he or she may press a key to forward the call to a preselected number or press another key to pass a busy signal to the caller.

Auto attendant systems in the prior art give the extension owner few options for handling incoming calls. The only options given to the extension owner by prior art auto attendant systems is accept or reject the call with call screening or to accept, reject, or forward to another number (typically voice mail) with call waiting.

With a live receptionist answering the telephones at a central switchboard instead of an auto attendant system routing calls or answering the telephones, many more options are possible than are available in the prior art. There is a need for auto attendant systems to give additional options to extension owners so that extension owners will find an auto attendant system an acceptable substitute for a live telephone receptionist.

SUMMARY OF THE INVENTION

The present invention gives extension owners additional options for handling incoming calls on a "real-time" basis. By "real-time" is meant that the extension owner need not decide in advance, before the call is received by the auto attendant system, how to handle the call. Such decisions can be made on a call-by-call basis as each call is received. The options offered to extension owners on a real-time basis by the invention include requesting the auto attendant system to play one of several recorded messages, such as a greeting, including a message recorded at that moment by the extension owner, and then transferring the caller to voice mail or another extension, or hanging up, or giving the caller the option of entering another extension number.

According to one aspect, the invention is a method for a communication system (such as a central office system or a customer premises auto attendant system) to process a call from a caller to a called party. The method comprises the steps of receiving the call from the caller and sending a notification to the called party of the receipt of the call. The method also comprises the step of allowing the called party to select a response to the notification. The response is selected from three or more responses, including 1) to reject the call and transmit a first greeting to the caller, 2) to reject the call and transmit a second greeting to the caller, and 3) to accept the call. The method also comprises the steps of receiving the selected response from the called party, and processing the call in accordance with the selected response.

According to another aspect, the invention is another method for a communication system to process a call from a caller to a called party. The method comprises the steps of receiving the call from the caller and sending a notification to the called party, along with a prompt comprising words, seeking a response selected from two or more responses.

According to another aspect, the invention is a communication system to process a call from a caller to a called party, such as an auto attendant system. The communication system comprises first and second receivers, and first, second, third, and fourth circuits. The first receiver receives the call from the caller. The first circuit sends a notification to the called party of the receipt of the call from the caller. The second circuit allows the called party to select a response to the notification. The response is selected from three or more responses. The three or more responses include 1) to reject the call and transmit a first greeting to the caller, 2) to reject the call and transmit a second greeting to the caller, and 3) to accept the call. The second circuit receives the selected response from the called party. The third circuit transfers the call to the called party if the selected response is to accept the call, and the fourth circuit processes the call in accordance with the selected response if the selected response is any response other than to accept the call.

BRIEF DESCRIPTION OF THE DRAWINGS

FIG. 1 is a flow chart of the overall operation of an auto attendant system in accordance with the present invention.

FIG. 2 is a flow chart of the actions of the auto attendant system of the present invention when the auto attendant system is attempting to connect to a called party.

FIG. 3 is a flow chart of the holding options and actions of the auto attendant system of the present invention.

FIG. 4 is a flow chart of the reroute options and actions of the auto attendant system of the present invention.

DETAILED DESCRIPTION OF THE INVENTION

Figure 5:
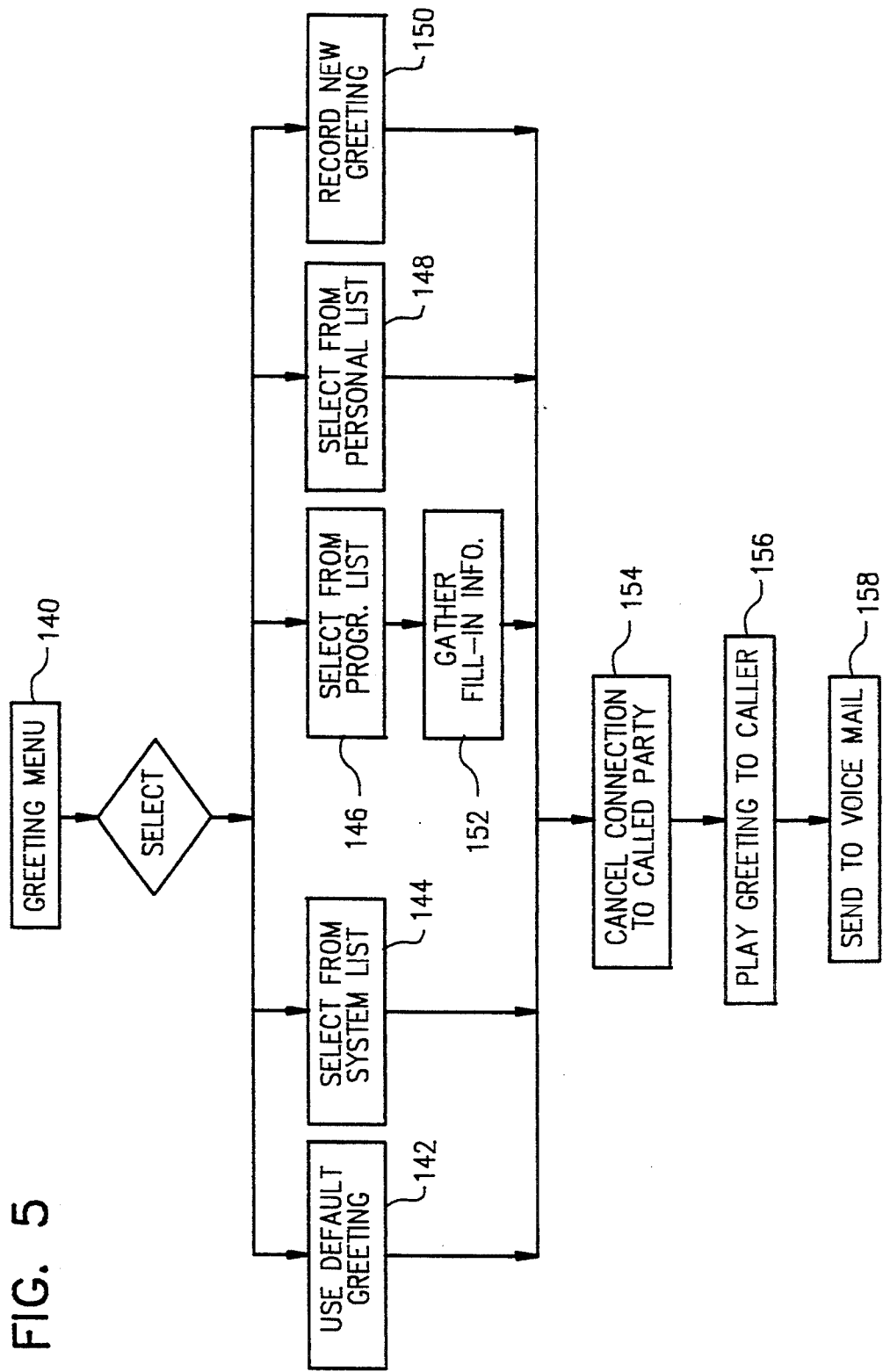
FIG. 5 is a flow chart of the select greeting action of the auto attendant system of the present invention.

FIG. 1 is a flow chart of the overall operation of an auto attendant system in accordance with the present invention. In the preferred embodiment, the auto attendant system of the present invention can be implemented as a PBX controlled by a computer, such as an electronic personal computer, which has been programmed in accordance with conventional programming practices to accomplish the desired result. If desired, dedicated electronic hardware can be developed to produce the same result. The components required to develop such electronic hardware are conventional to the hardware designer of ordinary skill.

In operation, the auto attendant system receives the call placed by the caller (block 10). This may be accomplished by either taking the line through which the connection is made off-hook or establishing a digital link through the line between the caller and the PBX or, if the caller is internal to the system, receiving an internal call. Also, the system identifies the called party (block 12). This can be accomplished by various means. For example, the called party can be identified 1) in response to a voice prompt produced when the caller keys in a dual-tone multifrequency (DTMF) input to the auto attendant system, or 2) by using digital identification schemes such as direct inward dial (DID) or dialed number identification service (DNIS). Also, the auto attendant system identifies the caller (step 14) by various alternative means. Caller identification may be accomplished by automated voice recognition of the caller's voice or by a voice prompt followed by either recording of the caller's answer or receiving DTMF tones entered by the caller. Caller identification may also be accomplished by automatic number identification (ANI) or other conventional caller identification schemes such as Caller ID.

The call receiving and identification stage includes the first three steps (represented by blocks 10, 12 and 14). These steps can be performed in any order. For example, with DID and DNIS, the information about both the caller and the called party can be collected before the call is actually answered.

After completing the call receiving and identification stage, the auto attendant system attempts to connect to the called party (block 16). If unsuccessful, the auto attendant system sends the caller to a voice mail system to take a message (block 18). If the auto attendant system successfully connects to the called party's extension, it announces the call to the called party and presents the called party with options (block 20). These options may include 1) for the auto attendant system to ask the caller to hold, 2) for the auto attendant system to reroute the call to a substitute called party designated to accept the call, 3) for the auto attendant system to take a message from the caller, and 4) for the called party to accept the call. The called party may choose one of these options or not (block 22). Depending upon the option chosen (if any), the auto attendant system exercises holding options and actions (block 24), exercises rerouting options and actions (block 26), takes a message (block 28), or passes the call to the called party (block 30). If the called party does not choose an option, the auto attendant system cancels the connection (block 32) and sends the caller to a voice mail system to take a message (block 34).

FIG. 2 is a flow chart of the actions of the auto attendant system of the present invention when it is attempting to connect to the called party. This corresponds to block 16 in FIG. 1. First, the auto attendant system initiates a connection to the called party (block 40). This can be accomplished by issuing a hookflash with DTMF tones, by a digital switch command or by direct connection to the called party's extension. In the hardware system of the preferred embodiment, a connection is initiated at the same time to the called party's computer screen to present the options on the screen. In an alternate embodiment, the connection can be made to the computer only and the computer can alert the called party that a call is waiting.

Next, after the connection is initiated, the auto attendant system monitors the called party's line for an answer (block 42). An answer by the called party to the initiated connection can be recognized by any conventional means, such as, in a conventional telephone equipment only embodiment, interval analysis (for example, by the D/41 method), frequency analysis or digital switch information analysis. In an embodiment with a visual interface, such as the network of personal computers of the preferred embodiment, the system monitors the line to the personal computer and the answer is accomplished automatically by software in the personal computer. If there is an answer (Block 44), the auto attendant system announces the call to the called party and presents the called party with options (block 20, FIG. 1). Otherwise, the connection to the called party is cancelled (block 46), and the auto attendant system sends the caller to a voice mail system to take a message (block 18, FIG. 1).

FIG. 3 is a flow chart of the holding options and actions of the auto attendant system of the present invention. These options and actions are taken if the called party requests the auto attendant system to offer the caller the opportunity to hold (block 24, FIG. 1). In this case, the auto attendant system allows the called party to record a greeting or to select a prerecorded greeting from the called party to the caller (block 60).

After the connection to the called party is cancelled (block 62), the auto attendant system plays the greeting (chosen by the called party) to the caller (block 64). Next the auto attendant system begins to periodically inquire whether the caller is willing to hold (block 66). This could be either a hold within the auto attendant system or a PBX system, in case the office telephone system is a PBX system. If the caller is no longer willing to continue to hold, the auto attendant system sends the caller to a voice mail system to take a message (block 68). If, however, the caller is still willing to continue to hold, the auto attendant system plays a holding prompt to the caller (block 70). The auto attendant system then inquires whether the called party has requested to be connected to the call (block 72). In the hardware of the preferred embodiment, this is accomplished by determining whether the called party has indicated at the computer that the called party wishes to take the call. In the alternative embodiment without using a computer, the called party requests the call by calling another port of the auto attendant system and entering a DTMF or other command. If the called party still does not wish to take the call, the auto attendant system informs the caller that the called party is still busy (block 74) and returns to block 66 to inquire whether the caller is still willing to hold. If the called party has requested to be connected to the call, the auto attendant system transfers the caller's call to the called party and returns to block 16 of FIG. 1 (block 76).

FIG. 4 is a flow chart of the reroute options and actions of the auto attendant system of the present invention. These options and actions are taken if the called party requests the auto attendant system to reroute the call (block 26, FIG. 1). Initially in this stage, the auto attendant system asks the called party for the extension number of another extension owner who is designated as the substitute called party (block 100) and inquires whether the called party wishes to record a greeting or use a prerecorded greeting to send to the caller (block 102). In the preferred embodiment, the options are presented visually on the computer screen. Alternatively, if no computer hardware is used, this is done with voice prompts and DTMF tones. If the called party wishes to record a new greeting, the called party is prompted for a greeting which is then received and stored in the auto attendant system (block 104). In any case, the called party is then offered an opportunity to record an explanation or use a prerecorded explanation to play to the substitute called party whose extension number was supplied by the original called party (block 106). If the called party wishes to offer an explanation to the substitute called party, the auto attendant system prompts the called party for the explanation and records it (block 108). Those skilled in the art will recognize that the set of operations described in connection with blocks 102 and 104 are independent of the set of operations described in connection with blocks 106 and 108. The one set of operations can be performed with or without performing the other set of operations. Accordingly, the blocks 102 and 106 and the blocks 104 and 108 can be exchanged in the flow chart of FIG. 4 without affecting the overall operation of the preferred embodiment of the invention.

Regardless of whether an explanation is recorded by the called party, the auto attendant system then cancels the connection to the called party (block 110) and plays the greeting (if recorded) to the caller (block 112). Subsequently, the auto attendant system attempts to connect to the substitute extension number supplied by the called party in block 100 (block 114). This action is the same as the action described in block 16, FIG. 1 and detailed in FIG. 2. If the attempt to connect to the substitute extension number is unsuccessful, the auto attendant system sends the caller to a voice mail system to take a message (block 116). If the connection to the substitute extension number is successful, the explanation recorded (if any) by the called party at block 106 is played to the substitute called party (block 118). The substitute called party is now substituted for the original called party and the auto attendant system returns to block 20 in FIG. 1, to announce the call and offer options to the substitute called party (block 120).

FIG. 5 is a flow chart of the select greeting action of the auto attendant system of the present invention. The select greeting action is taken if the called party instructs the auto attendant system to take a message. At this point, the auto attendant system offers a number of greeting choices to the called party (block 140). These greetings can include a default greeting (block 142), a general system greeting (block 144), a programmable greeting (block 146), a personal greeting (block 148), or a new greeting (block 150). The programmable greeting includes fill-in information, such as the time of day, which the called party can supply (block 152) to complete the programmable message as appropriate. The personal greeting is selected from a list of greetings previously recorded by the called party. The new greeting can be recorded specifically as a greeting to the caller. After the appropriate greeting is selected by the called party (blocks 142-152), the connection to the called party is cancelled (block 154) and the greeting which has been selected is played to the caller (block 156). If appropriate, the caller is then sent to voice mail (block 158) to leave a message for the called party.

Figure 6:
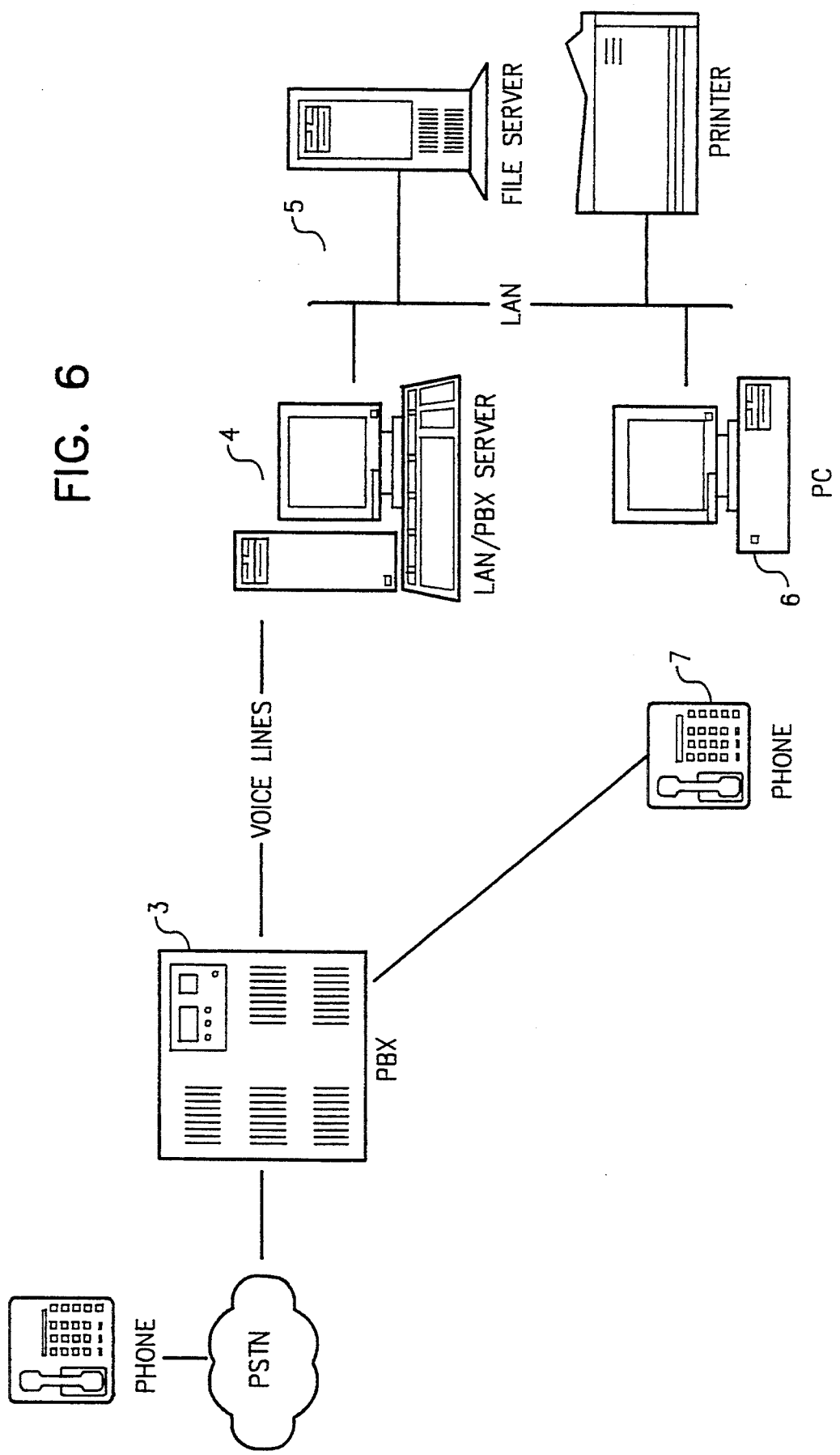
FIG. 6 is a depiction of hardware for implementing the preferred embodiment of the invention.

As shown in FIG. 6, the above system may be implemented with conventional prior art telephone call processing equipment, such as a PBX 3 connected to a computerized voice messaging system 4, using voice prompts and DTMF tones via telephone 7 to communicate between the user and the system. Equivalent equipment may be used for a central office implementation.

Preferably, a connection is established between the voice messaging system 4, and a local area computer system, such as a local area network 5. With this equipment, all of the prompts to the called party are displayed on a personal computer 6 at the called party's desk which is connected to the network. Presentation of the visual prompts for the called party and receipt of instructions from the called party are easily coordinated with the voice messages played to the caller and recorded from the called party since all these functions are performed by a single computer.

Alternatively, the system may be implemented using telephone equipment with a display screen, such as a liquid crystal display (LCD) screen, on each telephone. The prompts may be presented in abbreviated form on the LCD if it is small while additional explanation is given with voice prompts.

While the foregoing description has explained the method of the preferred embodiment of the invention in detail, those skilled in the art will appreciate that there are a number of alternative embodiments for accomplishing the method and apparatus of the present invention. Accordingly, the scope of the invention is to be determined only by the following claims.

We claim:

1. A method for a communication system including a plurality of extensions to process a call from a caller to a called party, one of said extensions being the called party's extension, comprising the steps of:
   a) receiving the call from the caller;
   b) sending a notification to the called party indicating receipt of the call; and
   c) receiving from the called party a selected response to the notification, the response being selected from two or more possible responses, the two or more possible responses including 1) to forward the call to a voice message recorder with a first greeting presented to the caller, and 2) to forward the call to a voice message recorder with a second greeting presented to the caller;
   wherein the first greeting is a prerecorded greeting available for use only at the called party's extension, and the second greeting is a prerecorded greeting available for use at the other extensions as well as the called party's extension.

2. The method of claim 1 wherein the first greeting is prerecorded and the second greeting includes voice sounds spoken by the called party after receiving the notification.

3. The method of claim 1 wherein step a) further includes determining information regarding the caller and step b) further includes forwarding such information to the called party.

4. The method of claim 1 wherein step b) further includes sending to the called party a prompt describing with words possible responses.

5. The method of claim 4 wherein the prompt is presented on a display.

6. A method for a communication system to process a call from a caller to a called party, comprising the steps of:
   a) receiving the call from the caller;
   b) sending to the called party a notification of receipt of the call;
   c) receiving from the called party a command to re-route the call to a substitute telephone number;
   d) receiving and recording from the called party a first and second audio message;
   e) transmitting the first audio message to the caller;
   f) re-routing the call to the substitute telephone number; and
   g) transmitting the second audio message to the substitute telephone number.

7. The method of claim 6 wherein step a) further includes determining information regarding the caller and step b) further includes forwarding such information to the called party.

8. The method of claim 6 wherein step b) further includes sending to the called party a prompt describing with words possible responses.

9. The method of claim 8 wherein the prompt is presented on a display.

* * * * *